United States Patent [19]

Edwards

[11] Patent Number: 4,837,425
[45] Date of Patent: Jun. 6, 1989

[54] SECURITY ARRANGEMENT

[75] Inventor: Philip J. Edwards, Chelmsford, United Kingdom

[73] Assignee: The General Electric Company, p.l.c., London, England

[21] Appl. No.: 80,499

[22] Filed: Jul. 31, 1987

[30] Foreign Application Priority Data

Aug. 7, 1986 [GB] United Kingdom ............... 8619286

[51] Int. Cl.⁴ ........................ G06K 7/10; G03H 1/26
[52] U.S. Cl. .................................. 235/457; 235/382; 235/454; 235/488; 350/3.6; 350/3.75
[58] Field of Search ............. 235/382, 485, 487, 488, 235/489, 494, 490, 438, 439, 454, 455, 45, 457; 340/825.3, 825.31, 825.32, 825.33, 825.34, 825.35; 350/3.6, 3.75

[56] References Cited

U.S. PATENT DOCUMENTS 4,108,367 8/1978 Hannan ............................. 235/485
4,362,930 12/1982 Ehrat ................................ 235/487
4,464,566 8/1984 Silverman ......................... 235/382

Primary Examiner—A. D. Pellinen
Assistant Examiner—Leon K. Fuller
Attorney, Agent, or Firm—Spencer & Frank

[57] ABSTRACT

A security arrangement includes a token in the form of a thin lamina which co-operates with a receptor. The token includes an optically readable pattern in the form of a bar code, and a thin film holographic reflector which deflects the light which is modified by the bar code onto an optical sensor. The optical sensor is positioned such that the light will not reach it in the absence of a holographic reflector.

22 Claims, 3 Drawing Sheets

SECURITY ARRANGEMENT

This invention relates to a security arrangement. The most common security arrangement currently used takes the form of a mechanical lock and key. Such an arrangement is not very secure unless it is very complex and expensive and even then it is rarely practicable to change the characteristics of the key without the need to fix a new lock. For example, if a key is lost without a duplicate being available, it is generally necessary to replace the entire lock. It is desirable to provide a security arrangement which is capable of being highly secure and for which the characteristics to which the lock responds can be easily and simply altered in order to preserve security over a long period of time. The present invention seeks to provide such a security arrangement.

According to this invention a security arrangement includes a token and a receptor, the token comprising a thin lamina carrying an optically readable pattern, and a thin holographic light deflector arranged to deflect light which is modified by said pattern; and the receptor comprising means for accepting the token and for detecting the deflected light.

The arrangement may comprise not merely a conventional key and lock arrangement constituted by the token and the receptor respectively, but a more versatile security arrangement which could for example, form part of a larger transaction system with the token serving to provide access to those parts of the system which enable a transaction, possibly of a financial nature, to be performed.

The thin lamina is preferably light transmissive and is arranged to carry the optically readable pattern and the holographic light deflector at its opposite major surfaces. The holographic light deflector may be arranged to produce a substantial degree of deflection of light and to bring the deflected light to at least an approximate focus at the position at which an optical sensor is located, or the holographic light deflector carried by the token may operate in conjunction with a futher light deflector carried by the receptor in order to direct the light onto an optical sensor. In this case preferably the further light deflector tades the form of a thin holographic deflector, which in operation is adjacent to the first mentioned holographic deflector. Thus in addition to producing a marked angular deflection, the first deflector is preferably arranged to "scramble" the light incident upon it, and the further light deflector provides a complementary action.

The optical pattern can take the form of a complex bar code having many possible combinations, typically well in excess of one million. However, in order to break the security afforded by this invention, it is not sufficient merely to duplicate the particular code which is carried by token, as the coded light will not reach the optical sensor unless it is correctly directed thereto by the holographic deflector. As the holographic deflector is itself of negligible thickness, it can be incorporated as a thin film at the surface of the token. Such a hologram is very difficult to reproduce from a sample of a token, particularly as its optical response will depend on the nature of the optical properties of the lamina itself and on any external protective coating which is applied to it. It will thus not be practicable to make a simple copy of the hologram from an existing token, particularly as each token incorporates an optical pattern, e.g. a bar code. Removal of the layer of the token which incorporates the bar code within it will alter the optical properties of the deflection produced by a substantial amount such that the light will no longer be detected by the optical sensor forming part of the receptor. Furthermore, in those security arrangements in which the two complementary holographic deflectors are present, no useful information as to the optical nature of the receptor can be derived from an examination of the token alone.

For any given localised application of the security arrangement a different holographic deflector can be incorporated into the token. For example, if the security arrangement is used in place of conventional door locks for the rooms of a hotel, each hotel could utilise a defferent hologram. Alternatively, if the security arrangement is used as a car door lock, a number of different holograms could be used for vehicles of a different manufacture or model. Since each application could have a relatively few number of tokens associated with a particular hologram, it would be unproductive to perform the very expensive and critical process necessary to replicate a particular hologram if the end result has only a very limited usage.

One way in which the security of the arrangement can be enhanced is to provide the receptor with a very narrow slot in which an inserted token is a very close fit. This ensures that the thin film holographic deflector could not be replaced by the real optical arrangement which it simulates. Thus if the holographic deflector produces a marked angular deflection of light passing through it, the equivalent optical lens or prism would be relatively bulky and could not be inserted through the very thin slot designed to accept only the thickness of a thin card-like token.

Instead of utilising an optically transmissive token, the token could incorporate a reflective surface at one face so that the optical sensor is positioned on the same side of the token as a source of light which illuminates the optical pattern. This permits the possibility of being able to provide a receptor consisting merely of a flat surface which is presented to a user. In the absence of a slot, access to the internal workings of the receptor is denied rendering it more tamper-proof.

BRIEF DESCRIPTION OF THE DRAWINGS

The invention is further described by way of example, with reference to the accompanying drawings, in which.

DESCRIPTION OF A PREFERRED EMBODIMENT

Figure 1:
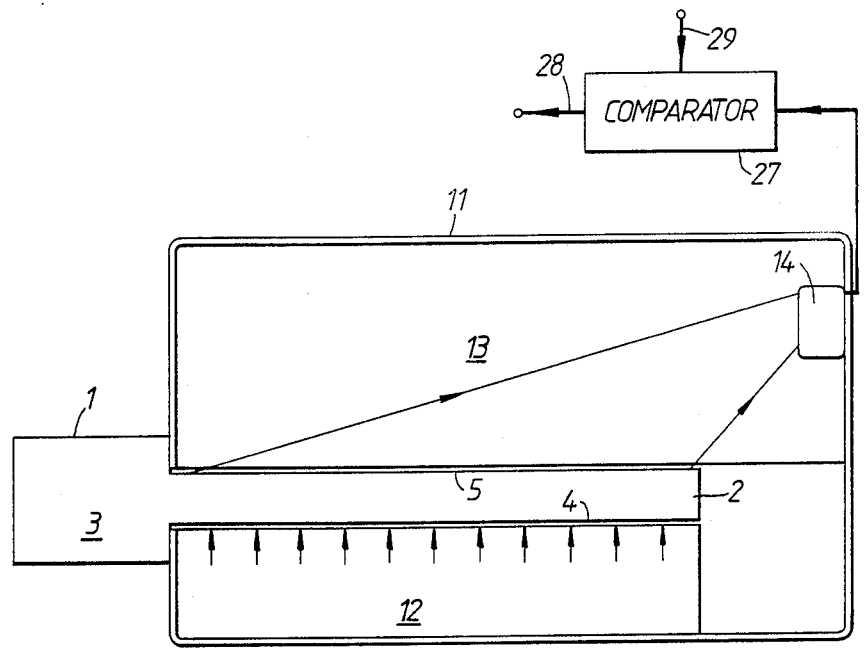
FIG. 1 illustrates a sectional view of one embodiment of a security arrangement in accordance with the invention.
Figure 2:
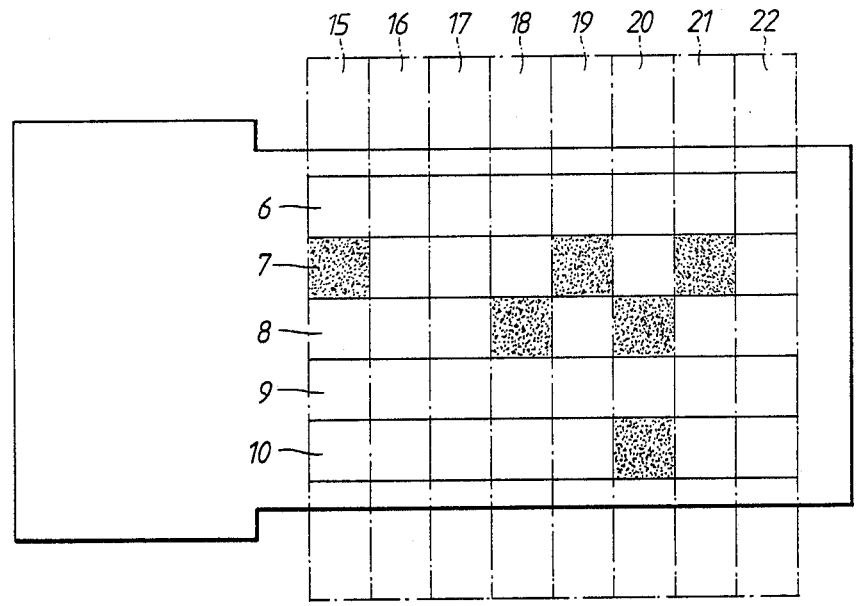
FIG. 2 illustrates a token in a diagramatic fashion.
Figure 3:
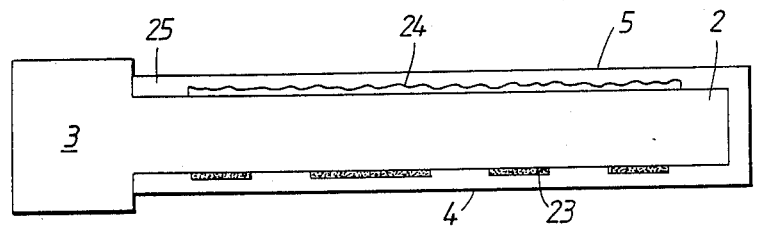
FIG. 3 illustrates a sectional view through a token in greater detail.

Referring to FIGS. 1, 2 and 3, a token 1 takes the form of a very thin rectangular lamina or sheet 2 of transparent plastics material having a slightly thicker opaque handle portion 3. This token 1 carries an optically readable pattern at one surface 4 and a holographic deflector at its other surface 5. The nature of the optically readable pattern is illustrated in FIG. 2 and it will be seen that it consists of five elongate stripes 6, 7, 8, 9 and 10 carrying bar code segments disposed along their length. In this instance, eight bar code segments are disposed along each stripe, and as the five stripes are provided, an extremely large number of different combinations of code can be achieved. In FIG. 1 token 1 is shown inserted within a light-tight housing 11 having a light source 12 positioned adjacent to the surface 4 and having a solid block of light transmissive material 13 positioned adjacent to the surface 5, with an optical sensor 14 being mounted within the material 13 but offset to the rear surface of the housing 11.

The light source 12 consists of eight discrete light sources, each of which takes the form of an elongate vertical stripe 15 to 22 of illumination. In operation, each light source is energised in turn and the resulting light passes through the bar codes and is deflected towards the light sensor 14. Although illustrated as a single sensor 14 it in fact consists of five separate detectors spaced vertically apart so that each detector is associated with a different one of the bar code stripes 6 to 10. In this example, the bar code consists of transparent and opaque segments, but instead the segments could exhibit optical polarisation properties for example.

In operation, the token 1 is inserted into the housing 11 of the receptor so that the optical pattern is correctly positioned with respect to the light source 12, and the handle portion 3 serves to exclude external light. On insertion, the light sources are automatically energised in turn by switch means (not shown) such that each of the five detectors of the optical sensor 14 receives light corresponding to the different segments of each bar code. The holographic deflector which is incorporated into the material of the token 1 at its surface 5 simulates an optical lens and serves to accurately deflect and focus the light on to the detectors. The inner surface of the housing 11 is coated with a light absorptive material such that light does not reach the detecetors by virtue of specular reflection. The provision of the optically transmissive material 13 within the housing 11 enables the optical properties of the system as a whole to be more precisely controlled, and part of it can contribute a lens which is operable in combination with the holographic deflector to direct the light to the light source 14. Thus in the absence of this lens, the optical properties of the holographic deflector are not such as to bring the light to a focus at the light sensor.

It will be appreciated that in the present instance light passing through the optical pattern would not reach the sensors 14 were it not for the marked deflecting effect of the holographic deflector. The deflection is made sufficiently great such that in the absence of the holographic deflector no light of any appreciable intensity would reach the optical sensor 14. Light which is detected at the sensor 14 is converted to a sequence of electrical pulses corresponding to the bar code patterns, and these are fed to a comparator 27, where these are compared with an external code to verify the validity of the token. In the event of a successful comparison, an output signal is provided over line 28 to open a latch, for example. The required code can be altered at any time via input line 29.

Figure 4:
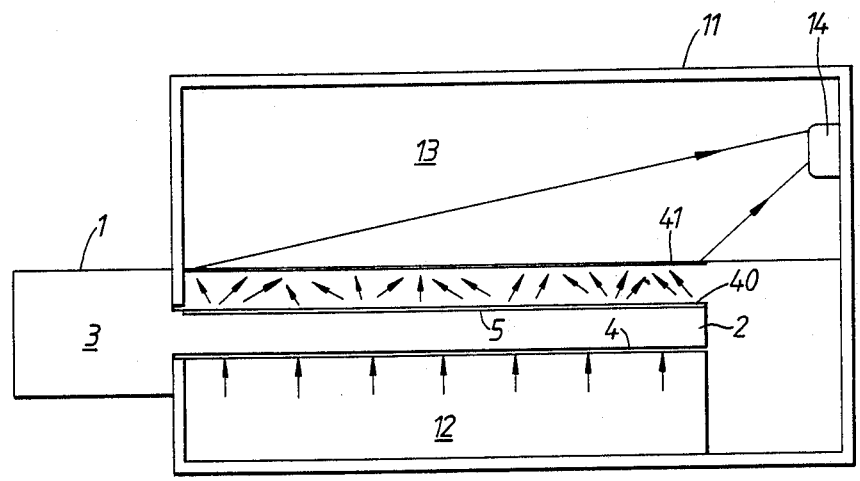
FIG. 4 illustrates a modified security arrangement.

Referring in more detail to FIG. 3, the optical pattern is formed at the outer surface of the optically transparent lamina 2 in the form of a series of opaque segments 23. At the opposite surface 5 of the lamina, the holographic deflector 24 is formed as a very thin embossed film. This film is produced by stamping a die derived from a master impression and is then attached by means of suitable adhesive to the surface of the lamina 2. The whole of the lamina 2, including the deflector 24 and the code segments 23, is then encapsulated in a thin transparent protective plastics coating 25 which has optical properties, such as refractive index and colour, which correspond as closely as possible to those of the lamina 2. In practice, each of the constituent parts of the token would be made of an appropriate form of inert plastic material, FIG. 4 shows an embodiment which is similar to that of FIG. 1, but in this instance two thin film holographic deflectors 40 and 41 are provided, deflefctor 40 being embedded in the surface of the token 1, and the other deflector 41 being mounted at the surface of the material 13. The action of deflector 40 is to scramble and deflect the light so that at its outer surface the light represents random variations in intensity and direction. The action of deflector 41 is complementary in that it gathers this random light, and re-directs it in an ordered manner so that it is brought to a focus at the light sensor 14. The merit of this particular arrangement is that the optical properties of the token cannot be readily deduced from an examination of the hologram which it carries. Furthermore, the holographic deflector 41 can be such as to direct light to different positions within the housing, depending on the position chosen for the light sensor 14.

Alternatively, different pairs of deflectors can all be such as to bring light to a predetermined focal point within the housing, with a particular deflector 41 being allocated to a particular hotel or model of car, etc.

Figure 5:
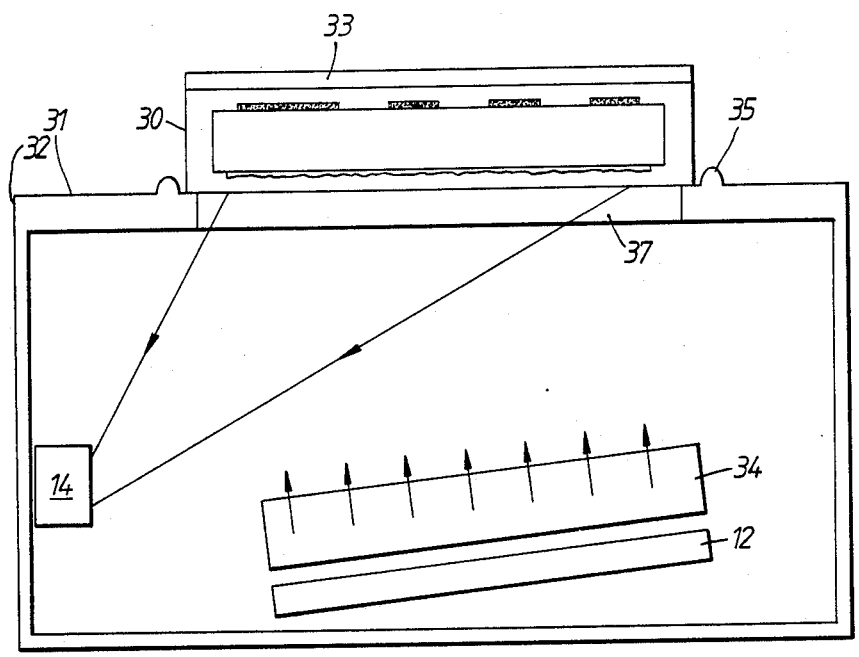
FIG. 5 illustrates an alternative embodiment of the invention.

An alternative embodiment is shown in FIG. 5 in which a token 30 is used by placing it upon an upper surface 31 of a receptor 32. The actual mode of operation and structure are very similar in principle to that already described with reference to FIG. 1, except that the light source 12 is now placed on the same side of the token 30 as the light sensor 14, and this is made possible by the provision of an external reflector 33 which is attached to one surface of the token. In order to ensure that light transmitted from the light source 12 does not reach the light sensor directly, a directional light transmissive plate 34 is mounted in front of the source 12. This consists of a matrix of apertures extending through the thickness of the plate so that the light from the source 12 is visible only in the straight ahead position. The merit of this particular embodiment is that access to the interior of the receptor is not required, thereby rendering it tamper-proof to a greater extent and avoiding any difficulties which could be caused by the obstruction of the slot in the receptor of FIG. 1 by debris or the like. A raised rim 35 indicates to a user the position in which the token should be placed on the upper surface 31. Instead of using an optical pattern which is used with visible light, it is preferred for the embodiment shown in FIG. 4, to employ a sensor 14 which responds to infra-red or ultra-violet light. The window 37, which is surrounded by the rim 35 is not transparent to visible light, but only to that light to which the sensor 14 is sensitive. Thus to a user of the system, the window 37 appears to be opaque and the internal construction is not visible. Similarly, the entire token can be coated with material which is opaque to visible light, so that neither the bar code nor the presence of the holographic deflector can be seen.

In FIG. 5, the operation of the security arrangement is initiated by a microswitch (not shown) which is activated by the physical presence of the token. In FIG. 1 a similar process can be used, but one or two of the stripes of the bar code can be used to generate clock signals as the token is inserted into the receptor. This would then require the provision of only a single light source.

I claim:

1. A security arrangement including a token and a receptor, the token comprising a thin lamina carrying an optically readable pattern, and a thin holographic light deflector arranged to deflect light which is modified by said pattern; and the receptor comprising means for accepting the token and for detecting the deflected light 2. An arrangement as claimed in claim 1 and wherein the thin lamina is light transmissive and is arranged to carry the optically readable pattern and the holographic light deflector at its opposite major surfaces.

3. An arrangement as claimed in claim 1 and wherein the receptor includes a receptor light deflector positioned such that, in operation, it is located between said holographic light deflector and the means for detecting deflected light.

4. An arrangement as claimed in claim 3 and wherein said receptor light deflector is also a thin holographic light deflector which is complementary to the first mentioned holographic light deflector.

5. An arrangement as claimed in claim 1 and wherein the holographic light deflector is arranged to produce a substantial degree of deflection of light and to bring the deflected light to at least an approximate focus at the position at which an optical sensor is located.

6. An arrangement as claimed in claim 1 and wherein the optical pattern is in the form of a bar code.

7. An arrangement as claimed in claim 6 and wherein the bar code consist of a sequence of opaque and light transmissive segments.

8. An arrangement as claimed in claim 1 and wherein the first mentioned holographic deflector is in the form of a thin embossed film, attached to one surface of the lamina.

9. An arrangement as claimed in claim 1 and wherein the optical pattern and the first mentioned holographic deflector are provided with an external protective coating.

10. An arrangement as claimed in claim 1 and wherein the receptor is provided with a housing having a narrow entry slot into which the token can be inserted.

11. An arrangement as claimed in claim 1 and wherein the token incorporates a reflective surface at one face so that light modified by the optical pattern is reflected onto the optical deflector.

12. An arrangement as claimed in claim 11 and wherein the receptor is provided with a surface adapted to receive a flat token which is placed upon it, the receptor including a source of light, the light of which is directed upon the surface, and an optical sensor arranged to receive said light which is directed towards it by the presence of a token at said surface.

13. An arrangement as claimed in claim 1 and including comparator means for comparing a signal obtained from the light detecting means and which is representative of said optically readable pattern, with an independently provided reference signal.

14. An arrangement as claimed in claim 13, and including means responsive to a successful comparison for providing an output signal indicative of the validity of the token.

15. An arrangement as claimed in claim 1 and including a further light deflector, and wherein the holographic light deflector in combination with the further light deflector is arranged to produce a substantial degree of deflection of light and to bring the deflected light to at least an approximate focus at the position at which an optical sensor is located.

16. A token for use with a security arrangement which includes a receptor having means for accepting the token and having means for detecting light, said token comprising: a thin lamina carrying an optically readable pattern, and a thin holographic light deflector arranged to deflect, to the means for detecting light, light which is modified by the pattern.

17. A token as claimed in claim 16 and wherein the thin lamina is light transmissive and is arranged to carry the optically readable pattern and the holographic light deflector at its opposite major surfaces.

18. A token as claimed in claim 16 and wherein the optical pattern consists of opaque and light transmissive segments.

19. A token as claimed in claim 16 and further including a reflective layer on the token to reflect light that has been modified by the optical pattern onto the holographic light deflector.

20. A token as claimed in claim 16 and wherein the optically readable pattern is carried by the thin lamina in a first plane and the thin holographic light deflector is carried by the thin lamina in a second plane that is different from the first plane.

21. A token as claimed in claim 20 and wherein the first and second planes are spaced apart and substantially parallel.

22. A receptor for use in a security system which includes a token having a thin lamina carrying an optically readable pattern and carrying a thin holographic light deflector arranged to deflect light which is modified by the pattern, said receptor comprising: means for accepting the token, and means for detecting light which has been modified by the pattern and deflected by the holographic light deflector.

* * * * *